Aug. 3, 1965 W. F. HUCK 3,198,451

ROLLSTAND MECHANISM FOR CONTINUALLY DELIVERING PREPRINTED WEBS IN REGISTER

Filed April 12, 1963 6 Sheets-Sheet 1

INVENTOR:

WILLIAM F. HUCK

BY [signature]

ATTORNEY

INVENTOR:
WILLIAM F. HUCK

BY Albert C. Johnston
ATTORNEY

INVENTOR:
WILLIAM F. HUCK
BY Albert C. Johnston
ATTORNEY

Aug. 3, 1965 W. F. HUCK 3,198,451

ROLLSTAND MECHANISM FOR CONTINUALLY DELIVERING PREPRINTED WEBS IN REGISTER

Filed April 12, 1963 6 Sheets-Sheet 4

INVENTOR:

WILLIAM F. HUCK

BY Albert L. Johnston

ATTORNEY

INVENTOR:
WILLIAM F. HUCK
BY
Albert L. Johnston
ATTORNEY

INVENTOR.
WILLIAM F. HUCK
BY Albert C. Johnston
ATTORNEY

United States Patent Office 3,198,451

Patented Aug. 3, 1965

3,198,451
ROLLSTAND MECHANISM FOR CONTINUALLY DELIVERING PREPRINTED WEBS IN REGISTER

William F. Huck, 81 Greenway Terrace, Forest Hills, N.Y.

Filed Apr. 12, 1963, Ser. No. 272,664
24 Claims. (Cl. 242—58.3)

This application is a continuation-in-part of my copending application, Serial No. 15,219, filed March 15, 1960, and now abandoned.

This invention pertains to mechanisms for handling web materials such as paper, cloth, foil and the like, which materials carry preprinted matter in a form requiring the maintenance of proper registration of such preprinting during subsequent handling of the web. Thus, for example, the web material may be preprinted with wrapper or package labels or the like, and then rolled up for use at some future time or place. When such rolls of preprinted material are to be used, for example in a packaging or labeling operation, it is necessary to ensure that the web material is forwarded in proper timed relation to the other functions of the machine in which it is used, so that the final labeled or wrapped articles will bear the imprints in proper position. The same problem arises in connection with the insertion of pre-printed diagrams, maps, multi-color picture pages and the like, in web form, into presses producing high quality black and white books, magazines, newspapers and so on. Machines providing for the automatic maintenance of proper "register" of the imprints in this sense are well known, usually employing some means for sensing the location of reference marks included on the web material in a fixed position relative to each separate imprint.

Since the size of any supply roll of web material is limited, it is necessary to provide some way of effecting a splice between the expiring end of a nearly exhausted supply roll and the leading part of web material carried by a new and full roll, if machine stoppage and/or re-threading are to be eliminated. As machine speeds increase in response to industry demands, the intervals between roll changes become shorter, and at the same time the problem of making each individual splice is made more difficult simply because of the higher travel speed of the material. Roll handling equipments generally identified under the title of "rollstands" have been developed to solve the problem of automatic high-speed splicing in the case of unprinted web materials; that is, in which the supply roll carries blank web material. A machine overcoming that problem is described and claimed in my copending application for patent, Serial No. 786,843, filed January 14, 1959, now Patent No. 3,103,320. Such machines, however, do not provide for the maintenance of register as between the imprints on the expiring web supply and those appearing on the new supply to be spliced thereto, and consequently a considerable amount of the web material is wasted during the interval in which the processing machine re-establishes correct register as to the new web supply. It will also be readily understood that since preprinted materials are usually being applied in timed conjunction with other objects, articles or materials, the waste of web material due to misprinting or miscutting may be aggravated by the necessity for constant inspection of the finished products, and excessive rejection of defective or improperly wrapped or labeled packages or articles.

It is accordingly a major object of the present invention to provide a mechanism for effectively delivering preprinted web material in register to a rotary web processing unit continually from one web supply roll after another at a web feeding rollstand.

Another object of the invention is to provide a splicing rollstand for high speed web-handing machinery, which will operate to maintain at high web speeds proper relative registration as between the imprints on web material at the tail end of an expiring roll thereof, and the imprints appearing at the leading end of a fresh supply of such material.

It is a further object of the invention to provide an automatic rollstand as above in which provision is made for bringing a new supply roll of material up to speed, in preparation for the splicing operation, and for maintaining not only its speed but the relative or "phase" position of imprints on such material in proper synchronism with those on the expiring end of a prior supply roll, so that the splice, when initiated under either manual or automatic control, will be made without any significant change in the register of such imprints with respect to the remainder of the processing machinery. The automatic initiation of such a splice may, for example, result from the automatic sensing of imminent exhaustion of the web roll currently supplying the machine.

In referring above and hereinafter to "preprinted" web materials, it will be understood that the imprints may be actual printed matter, but that any repeated pattern of or on the material may equally well be the controlling factor with respect to registration; thus, a cut-out or other structural feature of the web material may be the significant register element or the term may even designate some item which is affixed to the web at regularly spaced positions. All such repeated patterns fall within the scope of the invention in its broader aspects, although for brevity and clarity the following description will refer specifically to printed patterns as the register-determining factor or register elements.

In general, the invention accomplishes its objects by providing a rollstand which will mount at least a supply roll for current use as well as a full replenishment or "new" roll, together with means for bringing the new roll up to a speed suitable for the matching of its peripheral speed to the speed of the web running from the expiring supply roll and means for bringing a register element fixed relative to the pattern on the surface of the new roll into at least approximate coincidence with a register element on the running web, so that splicing may be effected at high speed with the register elements on the webs of the two rolls at least approximately in register, and quite closely so according to preferred embodiments.

The invention also comprehends the provision of devices for sensing the instants at which register-determining pattern features respectively on the two webs before splicing and on the portion of the running web following the splice pass established reference locations, and means for altering the speed and position of the running web and the new roll relative to a rotary processing unit to which the running web is delivered, and relative to each other, to the extent necessary to establish and maintain the desired congruence of the preprinted patterns on the two webs and the required continuity of registration with the web processing unit.

The above-mentioned and other objects, features and advantages of the invention will best be understood by referring now to the following detailed specification of certain preferred ways of accomplishing the desired ends, given by way of illustration and not for purposes of limitation, and taken in connection with the appended drawings, in which:

FIG. 1 and FIG. 2 taken together show in schematic side elevation a mechanism in accordance with the invention;

*First embodiment*

Figure 1:
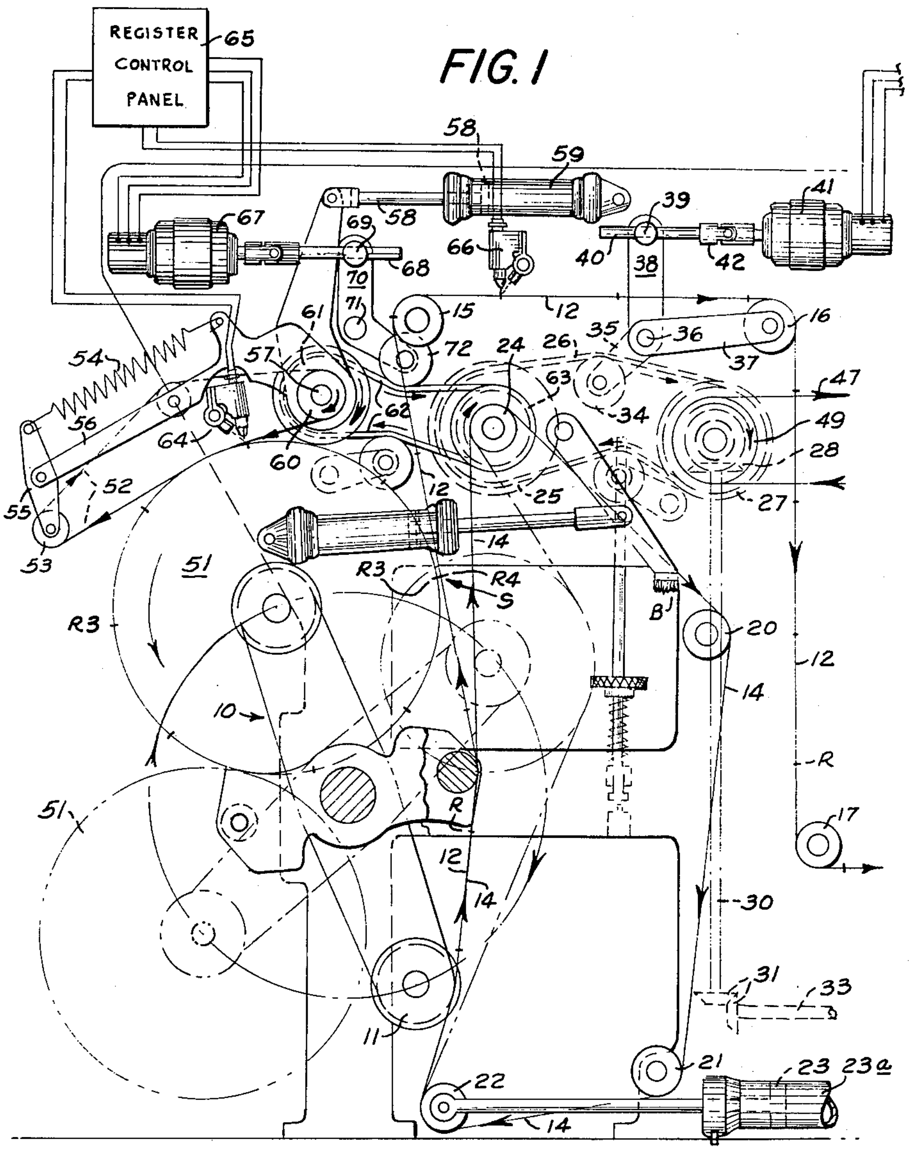
Figures 2, 6:
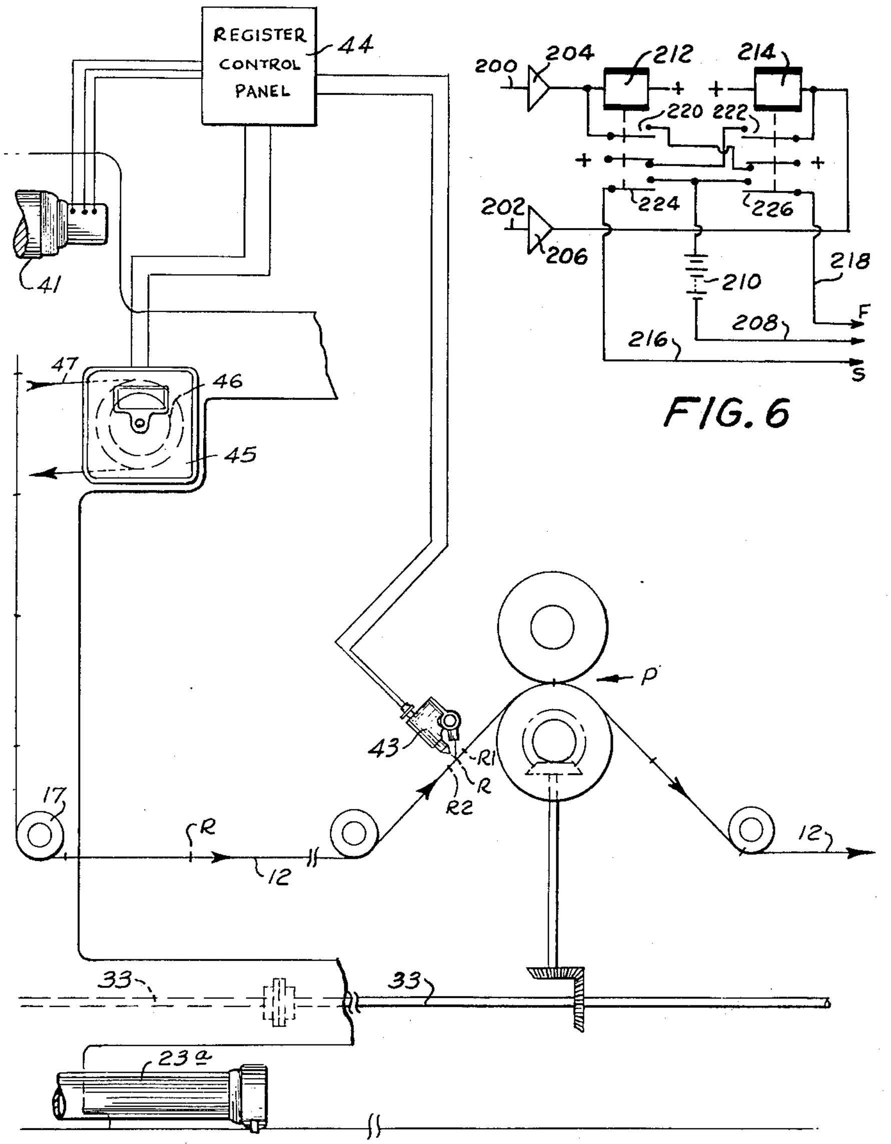
FIG. 6 is a schematic wiring diagram of one form of pulse-comparing circuit useful in the invention.

FIGURES 1 and 2 actually represent a single drawing divided between two sheets to permit an adequate scale, and they will be described together; it will be observed that the showing is schematic to the extent that certain parts are identified in block diagram form, and also that conventional machine frames and like supports, not forming novel features of the invention claimed herein, have been omitted for clarity. The description contained in the aforementioned copending application is incorporated herein by reference, and may be consulted for additional details not directly related to the objects of the present invention.

Basically, the mechanism here illustrated corresponds to that described in the copending application mentioned earlier herein, and thus includes similar means including a revolving spider structure 10 comprising parallel double-armed roll carriers so that rotation of the spider enables a replacement web roll 51 to be brought into position ready for splicing to the expiring end of a web drawn from a nearly-exhausted roll 11. The new roll is in turn used up, and during this interval the core of the expired roll is removed and replaced with a further full roll, the process being repeated indefinitely. The machine also includes devices, fully described in that earlier application, for performing the actual splicing operations under either manual or automatic control as to initiation; thus, an automatic brush B is illustrated to brush the expiring end of the web against the peripheral surface of the new web roll to pick up the new web after proper advance preparation, including application of an adhesive to the surface of the new roll. All these operations are detailed in the prior application.

In the present instance, the expiring roll 11 carries preprinted material 12, the register marks "R" evenly spaced thereon serving for register control relative to the processing unit or machine to which the web is being delivered, in the manner hereinafter described. Speed control and drive for the expiring web 12 is provided by an endless belt 14 which is in contact with web 12 and the periphery of its roll 11, and is under positive drive control. Web 12 passes upward over lead roller 15, turns right to pass over pivoting roller 16, and under lead roller 17 towards the associated processing machine indicated schematically at "P."

Belt 14 passes around rollers 20 and 21, belt tensioning roller 22 (actuated by piston 23 in pneumatic pressure cylinder 23*a*), and is driven by roller 24 through variable diameter pulley 25, V-belt 26 and V-belt pulley 27 which, in turn, is connected by bevel gearing 28, vertical shaft 30, bevel gearing 31 and horizontal shaft 33 to the main drive of the process machine. V-belt 26 passes over idler pulley 34 mounted on arm 35 rigidly fastened to shaft 36 fulcrumed in the rollstand side frames. Shaft 36 also carries pivotable arms 37, which support web contacting roller 16, and an arm 38 which carries nut 39 rotatable therein about a transverse axis parallel to shaft 36 but fixed with respect to the axis of threaded spindle 40 engaging the nut and in turn driven by reversible electric motor 41 through universal joint 42. The variable diameter pulley 25 is preferably of the type disclosed in U.S. Patent No. 2,812,666, issued November 12, 1957, to W. F. Huck, and in which changes in V-belt contacting radius are essentially instantaneously responsive to variations in V-belt tension with a minimum of attendant friction and energy loss.

Motor 41 is controlled by a photoelectric scanning head 43 (FIGURE 2) which senses the position of register marks "R" on web 12 and emits a corresponding pulse or impulse which is received by register control panel 44 and then amplified and compared, as to timing, with a similar impulse emitted by a timing device or rotary selector switch 45. The latter impulse is preferably derived from a slotted disc system which is arranged to provide impulses in accurately timed relation to the recurrence of operations of process machine P. The slotted disc 46 is thus driven by a non-slip belt 47 from a pulley 49 mounted on the shaft which carries one of bevel gears 28 connected directly to the process machine drive-shaft 33. Scanning head 43 is located close to the processing elements of the machine, and any lack of synchronism between the relative position of the scanned register marks "R" and the timed signals emitted by switch device 45 is detected at register control panel 44 which thereupon generates an error signal of sufficient magnitude, and is either of proper polarity or is applied to the proper leads of motor 41, to cause the latter to pivot shaft 36 and thereby move the web-contacting roller 16. This action causes the web distance between unwinding roll 11 and the processing unit P to vary, and simultaneously varies the position of idler pulley 34 so as to cause a change in the speed of drive belt or belts 14, and thereby the speed of web 12. The direction of these changes is chosen to restore proper synchronism and "phase" of the imprints on web 12 relative to the process unit P, by a combination of a direct web displacement accompanied by an incremental and proportional speed correction sufficient to eliminate the lack of synchronism and to restore the web displacing roller 16 to its initial position.

More specifically, if the web register mark "R," as detected by scanning head 43, has advanced ahead of its proper position, as indicated for example at "R1" in FIGURE 2, an error signal is generated to rotate motor 41 and screw spindle 40 sufficiently to pivot arms 37 (carrying web contacting roller 16) and arm 35 (carrying V-belt take-up roller 34) counter-clockwise about shaft 36, thereby rearwardly displacing (or retarding) web 12 by an increment which tends to restore register mark "R1" to its correct position "R." This movement simultaneously increases the effective contact radius of constant speed V-belt 26 on variable diameter pulley 25, thereby rotating said pulley 25 at a slower speed and correspondingly decreasing the speed of belt 14 and the unwinding web 12 sufficiently to produce a supplementary retarding effect on the web also tending to restore register mark R1 to its correct position. These actions introduce another register error similar to the register error just corrected except that it is opposite in direction and smaller in magnitude. The subsequent detection of this newly introduced register error generates a new error signal which re-initiates the simultaneous correction actions previously described. In this fashion web register errors tend to become progressively smaller in magnitude as they are corrected by the combination of direct displacements and proportional speed changes imparted to web 12. The overall effect of this correction action is that the originally detected web register error is rapidly eliminated, by the combination of a direct displacement of web contacting roller 16 and a proportional web speed change, and the initial, mean position of roller 16 is thereafter restored, primarily by subsequent and progressively smaller combined correction actions resulting from the speed changes simultaneously introduced into web 12 by the recurring displacements of roller 16. Thusly the desired web condition is achieved and thereafter maintained within very close limits.

Similarly, if the position of register mark R has fallen behind its desired position as indicated at R2 with respect to the timed signal from switch device 45, motor 41 is again energized but in the opposite direction, thus pivoting arms 37 (and roller 16) and arm 35 (carrying V-belt take-up roller 34) clockwise about shaft 36. This action forwardly displaces (or advances) web 12 by an amount which tends to restore register mark R2 to its correct position R and decreases the effective contact radius of constant speed V-belt 26 on variable diameter pulley 25, thereby increasing the rotational speed thereof, and the linear speeds of belt 14 and web 12. The result of these actions is to introduce a smaller register error in the opposite direction thereby initiating a subsequent correction action. In this manner recurring web register errors of successively smaller magnitudes are eliminated until the desired register condition is achieved and continually maintained. Here again the register correction imparted to the web is a combination of a direct web advance by downward displacement of the web-contacting roller 16 and a proportional web speed increase, thereby restoring register mark R2 to its desired position R and allowing for the subsequent restoration of roller 16 to its initial position in the manner heretofore described.

Thus the web speed and the web "distance" between unwinding roll 11 and the processing unit P will be varied so that preprinted register marks R become exactly synchronized with the timed process machine drive, and remain correctly registered with respect to given operations subsequently performed upon said web. The tension in web 12 between unwinding roll 11 and processing unit P continually varies so long as register corrections are occurring. After precise register control has been achieved and thereafter maintained within very close limits, small web tension variations will recur and remain uncompensated for between these units. It should be understood that the use of such variable web-tension devices acting upon the web supply roll for the correction of web register variations is confined within carefully controlled limits, so that at no time will the inherent resiliency of the web (its ability to stretch or contract lengthwise under tension variations) be exceeded.

According to the invention, the preprinted or patterned web which is carried by the replenishing roll 51 is likewise registered with respect to the web already passing into the process unit P, and by means located near the point of splicing. Thus, the new supply roll 51 has been previously wound to a specified outer diameter so that the preprinted register marks R3 which appear on its outermost layer are equidistant and continuously repeated around the circumference, and also that the register marks on such outermost layer lie directly above the corresponding marks on the next inward layer. The outer end of the web on this roll has also been prepared in the usual way for splicing, as well understood by those skilled in the art and as described in the earlier application mentioned above. It will also be understood that the requirement for matching of register marks as between the two outer layers of the roll 51 in effect amounts to a requirement, for a supply roll of any commercially useful diameter, that there must be an integral number of inter-mark spaces about the circumference of the supply roll; any diameter which satisfies this criterion is possible, the actual number of such intervals being a matter of choice and in any event depenent upon the roll size and the size of the individual web pieces required by the process.

In order to make a splice, the new roll 51 is gradually accelerated by belt 52, passing around pulley 53 and tensioned by spring 54 acting through the lever 55 and supported on arm 56, which is fulcrumed about a shaft 57. Arm 56 is thus lifted away or lowered into a position in which belt 52 is in contact with roll 51; by a piston 58 cooperating with fluid pressure cylinder 59 in the manner disclosed in the prior application. Belt 52 is driven by roller 60 through variable diameter V-belt pulley 61 connected to belt drive roller 24 by V-belt 62 and V-belt pulley 63. The variable diameter pulley 61 is preferably of the type disclosed in U.S. Letters Patent No. 2,812,666, issued November 12, 1957, to W. F. Huck and has the features described previously.

Photoelectric sensing device 64 scans the preprinted register marks R3 on rotating roll 51 so that, when belt 52 drives roll 51 at a peripheral speed approximating that of unwinding web 12, impulses are received by the register control panel 65 and there amplified and compared with timed impulses from a second photoelectric sensing device 66 scanning the preprinted register marks on expiring web 12. A particular such mark on web 12 just at the point of splicing S is designated R4 in FIGURE 1, and if as a result of the indicated comparison it appears that register marks R3 on roll 51 are retarded with respect to a mark such as R4, an error signal is generated by control panel 65 and causes energization of reversible electric motor 67 to turn a threaded spindle 68 and thereby move swivel nut 69 to pivot bell crank lever 70 about its fixed shaft 71 to lower the idler pulley 72. This forces V-belt 62 deeper into the variable diameter pulley 61, resulting in a proportional increase in the rotational speed of roller 60, and of the linear speed of belt 52, and roll 51, in such amount as to compensate for the retarded passage of marks R3. Any tendency of this speed increase to overcorrect the detected register error introduces another register error which is opposite in sense to the originally detected error but smaller in magnitude. The subsequent detection of this newly introduced error reinitiates the correction action. In this manner web register errors of progressively smaller magnitude are eliminated until the desired register relationship is achieved and thereafter continually maintained.

The converse action follows upon the occurrence of premature or advanced passage of marks R3 with respect to marks such as R4, it being understood that variable diameter pulley 61 (like pulley 25) includes the usual restoring spring or equivalent means urging it normally into a condition of maximum driving diameter. The corrective action of the scanning means 64 and 66 will cease when the two kinds of register marks are moving synchronously. As indicated, the locations of the sensing devices are chosen so that when synchronism is accomplished, the register marks R3 and R4 will be exactly opposite one another at the point of splicing indicated by S, so that when the new web reaches the process machine as at P, no error in register will be detected by scanner 43, and there will be no period of improper register requiring extensive rejection of the work.

It will be understood that the sensing means 64 and 66 need be in operation only during a period just prior to and perhaps during the actual splicing operation, and this portion of the system can therefore at other times be inactivated, either manually or automatically, as by controlling it from the same circuits which initiate the other rollstand operations preparatory to a splicing function.

*Modified first embodiment*

Figure 3:
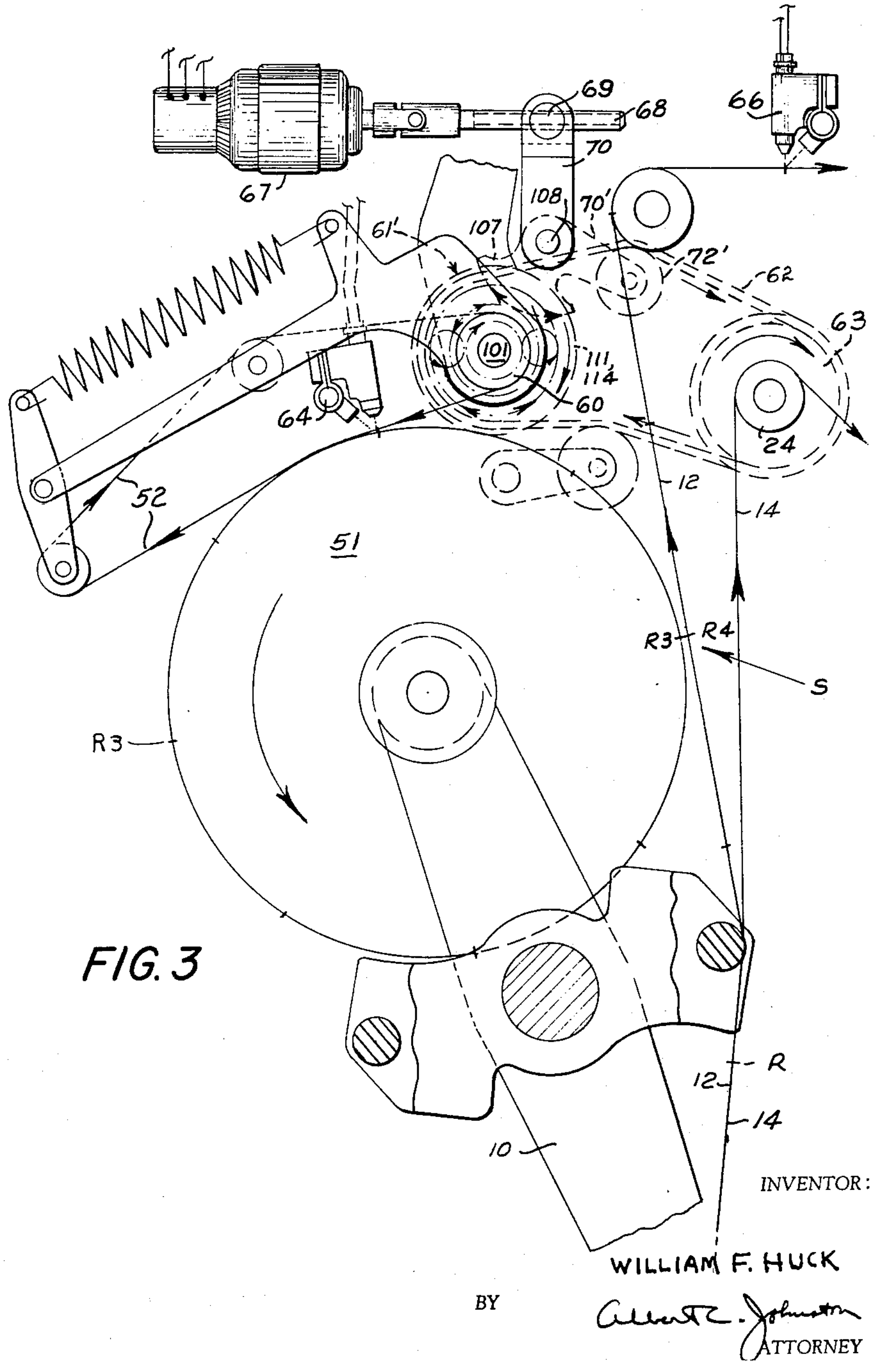
FIG. 3 is a view similar to a portion of FIG. 1, but drawn to a larger scale and illustrating a modified form of the invention.
Figure 4:
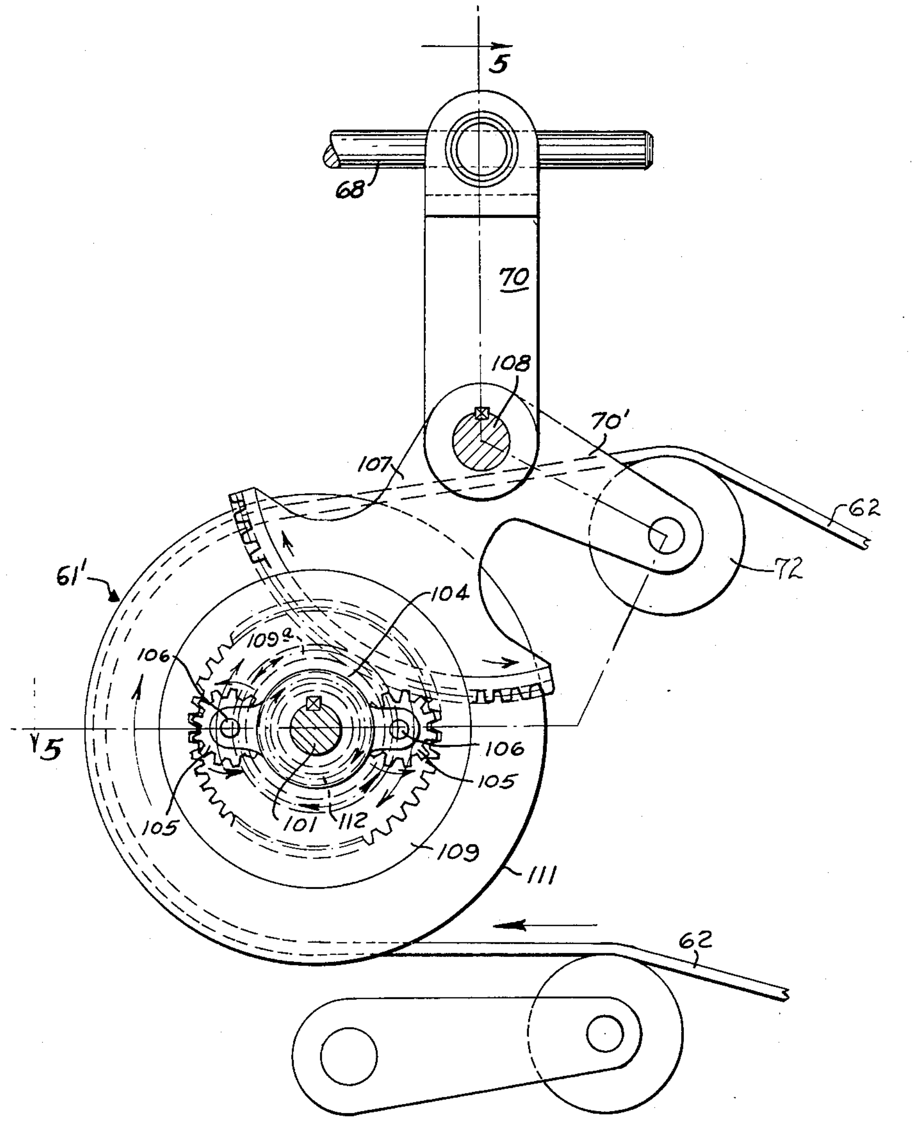
FIG. 4 is a further enlargement of a portion of FIG. 3, with parts shown in section as taken along the line 4—4 of FIG. 5.
Figure 5:
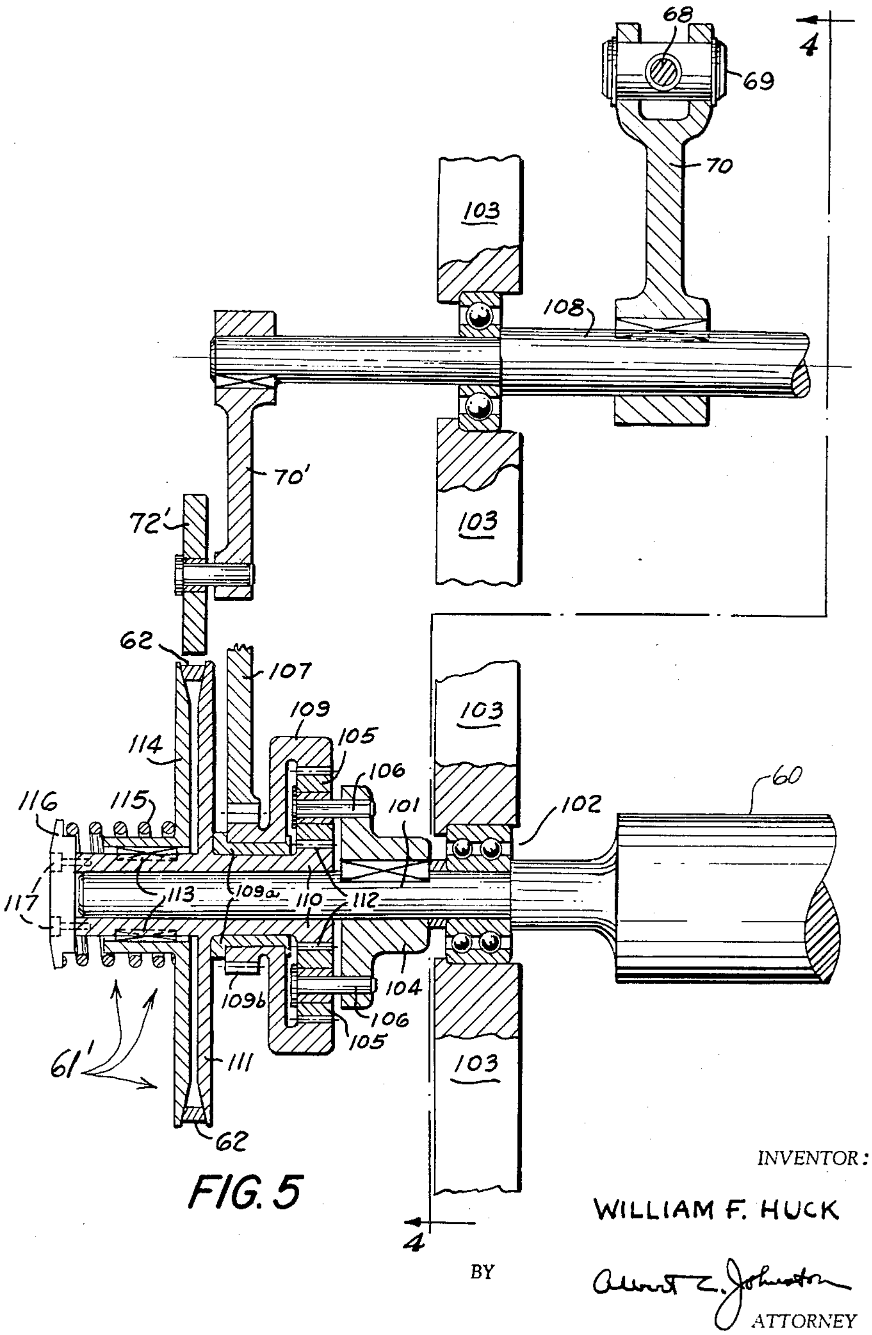
FIG. 5 is a sectional view taken on line 5—5 of FIG. 4.

An alternate form of the invention, capable of faster response in the detection and correction of register errors, is shown in FIGURES 3 to 5 of the drawings, and will now be described. Actually, a considerable portion of the mechanism of this embodiment is similar to or identical with that already described, and the description of such parts will not be repeated. However, and whereas in the form so far described the positional displacement of the replenishing roll 51 was accomplished by a change in the drive speed of belt 52 and consequently of roll 51, in this modified form of the invention the immediate change in effective roll position (as distinguished from speed) is accomplished by a direct displacement in the rotary position of the roller 60 driving the drive belt 52, accompanied by a small but proportionate change in the steady-state speed of the drive belt to preclude or at least minimize the gradual development of another register discrepancy. The result is a very fast-acting correction of register errors.

Using the same reference numerals as employed heretofore, for identical parts, the roller 60 drives accelerating belt 52, but in this case it has an extended journal 101 supported in bearing 102 located in the rear machine frame 103. Keyed to said journal 101 is a supporting hub 104 for the planetary gears 105 which ride on studs 106 fixed in the hub. Engaged by a gear segment 107, which is mounted on and rotatable with shaft 108, is the gear 109*b* integral with gear 109. Shaft 108 has its angular position controlled by the reversible correction motor 67 as before, the screw spindle 68 again engaging nut 69 and thus positioning the bell crank lever 70, and shaft 108.

Lever 70', carrying idler roller 72', is keyed to, and moves with, the shaft 108. Internal gear 109 rotates on bearing 109*a* carried by extended hub 110 of pulley half 111. Sun gear 112 is an integral part of this extended hub 110. Extended hub 110 of pulley half 111 has slidably keyed thereto as at 113 the pulley half 114, urged to the right (in FIGURE 5) by spring 115 retained in place by a cap 116, and screws 117 threaded into the extended hub 110 of pulley half 111. As so constructed, pulley halves 111 and 114 form a variable diameter pulley 61' which is driven by V-belt 62.

Under the desired operating conditions preprinted register marks R3 on rotating replenishing roll 51 are passing photoelectric scanning device 64 at the same instant that register marks R4 are passing photoelectric scanning device 66, and the speed of the expiring web 12 (driven by belt 14) and the speed of the periphery of roll 51 (driven by belt 52) are identical (FIGURE 3). Accelerating belt 52 is driven from V-belt 62, which imparts clockwise rotation to variable diameter pulley 61' and to sun gear 112 integral with pulley half 111 (FIGURE 4). This rotation of sun gear 112 causes planetary gears 105 to rotate counterclockwise and, since internal gear 109 is held stationary because of a lack of any error signal to energize motor 67, a clockwise rotation is imparted to supporting hub 104 (for gears 105) and also to extended journal 101 of roller 60 driving accelerating belt 52. The proportions of this differential gear drive are so chosen that the speed of belt 52 is identical to the speed of expiring web 12 under these synchronized register conditions.

Assuming that preprinted register marks R3 on rotating replenishing roll 51 are passing photoelectric scanning device 64 later than register marks R4 pass the photoelectric scanning device 66, an appropriate error signal is generated and amplified, thereby rotating motor 67 and causing screw 68 to pivot shaft 108 counter-clockwise (FIGURES 3 and 4). This action causes gear segment 107 to rotate counter-clockwise, and internal gear 109, engaging planetary gears 105, will rotate clockwise with respect to sun gear 112 which is integral with variable V-belt pulley half 111. This pulley half, together with pulley half 114, is connected, via V-belt 62 and pulley 63, to roller 24 which drives belt 14 at a constant speed relative to the speed of accelerating belt 52, thus precisely controlling the position of register marks R4 at all times. The clockwise rotation of internal gear 109 imparts a direct but supplementary clockwise (FIGURES 3 and 4) rotation to the existing steady state clockwise rotation of hub 104 which carries planetary gears 105 and is keyed to extended journal 101 of roller 60 driving accelerating belt 52. Therefore, this differential drive imparts a direct supplementary forward displacement to accelerating belt 52 and roll 51, thereby moving register marks R3 towards register marks R4, the relative position of which remains unchanged at all times.

Counter-clockwise rotation of shaft 108 also causes idler pulley 72' to force V-belt 62 deeper between the variable diameter pulley halves 111 and 114, thus proportionally increasing the speed of roller 60, accelerating belt 52 and correspondingly increasing the rotational speed of replenishing roll 51. This speed increase of roll 51 precludes the gradual development of another register discrepancy. Any tendency of this combined direct displacement and associated speed increase of roll 51 to over-correct the originally detected register error introduces another register error which is opposite in sense to the originally detected error but smaller in magnitude. The subsequent detection of this newly introduced error reinitiates this combined correction action. In this manner register errors of progressively smaller magnitudes are eliminated until the desired register relationship is achieved and thereafter continually maintained.

Therefore, this differential drive imparts a register correction composed of a direct displacement to the replacement roll combined with an associated, and proportional, speed change to the roll. This mechanism results in a correction which is, for all practical purposes, immediate and proportional to the detected register error.

Similarly, for the case of premature passage of register marks R3 under photoelectric scanning device 64 relative to register marks R4, the converse action occurs. In either event, the register marks R3 and R4 become, and will subsequently remain, in precisely correct relative position, so that when the splice is made, the process machine will receive in effect a continuous web having no defect as to register, and thus will not operate improperly for the interval otherwise needed to achieve correct register.

*Impulse comparing circuits*

It will have been recognized that, in effect, the control of the direction of rotation of correction motors such as 41 and 67 depends upon a time comparison of the pulses making up individual pulse trains derived from the respective photoelectric scanners or like sensing means for the register marks on related webs. In the systems illustrated, if the impulses of one set or train are substantially superimposed in time on those of the other set or train, no motor action is required, but if the pulses of one set are early or late relative to those of the other, the motor is to be rotated in a corresponding direction. The details of circuits capable of performing this time or phase comparison between two sets of periodic impulses form no essential part of the invention, and may be chosen from those available and well known in industry. However, a representative simplified form of such circuitry is illustrated in FIGURE 6 of the drawings, merely for the sake of completeness of the present specification.

Thus, in FIGURE 6, numerals 200 and 202 designate channels which respectively carry the timed photoelectric pulses from the respective photocell devices to amplifiers 204 and 206. The common lead 208 from a current source 210 extends to the reversible motor such as 41 or 67, while the other terminal of source 210 is arranged so as to be extended to one or the other of the motor terminals depending upon which of two relays 212 and 214 is energized. Thus, relay 212 has a normally open contact set 224 which, when the relay is operated, closes to apply current from source 210 to the motor lead 216 which will operate the motor in the direction to decrease the speed of the associated drive, while relay 214 has a normally open contact set 226 which, when this relay is operated, will apply current to the motor lead 218 to cause the motor to operate in the reverse or "fast" direction.

Each relay also includes a set of normally open contacts 220 and 222 which when closed establish holding circuits for the corresponding relay, these holding circuits being completed through normally closed contact sets of the other relay, as shown in FIGURE 6. In such an arrangement, if the pulses of current from amplifier 204 are earlier than those from amplifier 206, the relay 212 will be pulled up or operated upon receipt of a pulse from amplifier 204, and will stay operated when the pulse ceases due to the closure of its own holding circuit, until said holding circuit is opened when relay 214 thereafter operates in response to the later pulse from its amplifier 206. While relay 212 is operated, its motor-control contacts 224 are closed and apply power to lead 216 to cause the motor to rotate in the direction to slow down the motion of the web whose register marks are sensed by that scanner which controls amplifier 204. The amount of movement of the motor shaft will thus be proportional to the amount by which the one pulse train is earlier than the other. Conversely, if the output pulses of amplifier 206 are earlier in point of time, relay 214 will pull up first, and stay operated until the later pulse momentarily operates relay 212 to release the holding circuit of relay 214.

The two interconnected relays thus constitute a flip-flop circuit such that one or the other of the two motor-reversing leads is energized, depending upon which relay operates first as to each pulse pair. As well understood by those skilled in the art, the relay operating and released characteristics will be chosen to prevent locking up of both relays; thus, the relays when connected as shown should be adjusted so that with relay 212 held operated by an earlier pulse from amplifier 204, subsequent operation of relay 214 will interrupt the holding circuit of relay 212 but the latter will not close the holding circuit of relay 214 until after cessation of the brief impulse from amplifier 206. In the arrangement shown, momentary overlap in the operation of the relays will simultaneously energize both of the direction-control leads of the motor, but this is unobjectionable and the motor will merely remain stationary during such periods.

It will also be noted that if the pulses from amplifiers 204 and 206 coincide in timing, so that no correction is wanted, both relays will operate momentarily, but neither will be locked up because both holding circuits are interrupted. Hence here again the speed control motor will remain stationary.

The system just described is given by way of example only, and more sophisticated arrangements will suggest themselves to those skilled in the art; one such employs, for example, a two-phase servo type of speed control motor, and the impulses at leads 200 and 202 are used to control the relative phases of two-phase power applied to the motor windings. A further variation may be of the type sold commercially by the General Electric Company under the designation "Longitudinal Register Control 3S7515–GT100." The photoelectric scanning heads themselves may be General Electric Company's "Photoelectric Scanning Head CR–7515–P202" or the like. The prior art affords many other examples of equivalent arrangements.

*Further embodiment*

Figure 7:
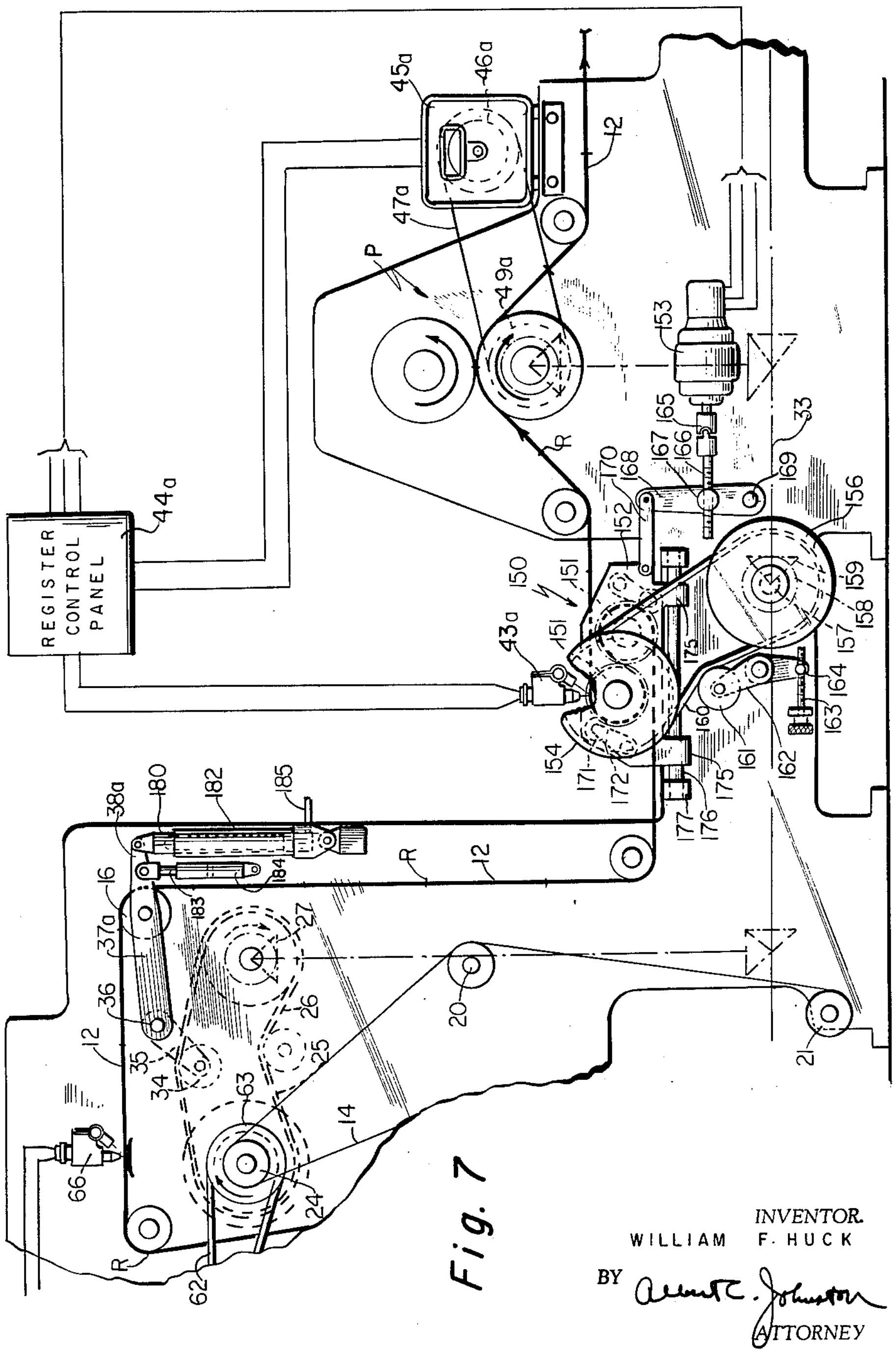
FIG. 7 is a schematic side elevation of a further embodiment of the invention.

The web processing mechanism illustrated in FIG. 7 is a further embodiment of the invention, having many features and elements in common with FIGS. 1–6. Again, a register element on the new web supply roll is brought first into at least approximate coincidence with a register element on the web 12 running from an expiring roll, for example, in the manner described in connection with either the first embodiment or the modified first embodiment hereof. In this further embodiment, however, the running web 12, and especially the portion of it following a splice produced by joining it to the web of a new roll at the rollstand, is held in register with the web processing unit P by the action of a web registering mechanism 150 acting upon it at a location near to that unit, while a rollstand tension control system keeps the tension of the web extending between the rollstand and the registering mechanism practically constant notwithstanding the displacements of the web effected by the registering mechanism.

As illustrated in FIG. 7, the running preprinted web 12 is kept registered to the web processing and propelling unit P by means of a reciprocable carriage assembly 150 which includes web driving cylinders 151 mounted on a movable carriage 152 positioned by a motor 153 under the regulation of register control means centered at control panel 44*a*.

The position of the cylinders 151 and carriage 152 determines the length of the path, hence the stretch, of the web portion extending between these cylinders and the web-propelling processing cylinders of unit P. A displacement of the carriage varies that length and stretch and at the same time introduces a proportional speed change into the web 12. This speed change is brought about by means of a variable speed drive composed of a driven V-belt pulley 154 connected to one of the cylinders 151, a driving V-belt pulley 156 of variable diameter connected to a cross shaft 157 driven from machine drive shaft 33 through bevel gears 158 and 195, and a V-belt 160 interconnecting the two pulleys. The speed of the rollers 151 at the initial position of the carriage 152 and, as well, the change of web speed effected by a unit displacement of the carriage are controlled by the position of a belt tensioning roller 161 which is rotatably supported on the upper end of a pivotable lever 162. The position of the roller 161 can be adjusted by rotation of a handscrew 163 which threadably engages nut 164 pivotably mounted on the lower end of lever 162.

The control of the web registering mechanism in this embodiment is effected by the action of elements similar to those described by use of the reference numerals 43–49 in connection with the first embodiment. These elements include a scanning head 43*a* sensing the passing of register marks R on web 12 at a location ahead of unit P, a rotary switch device 45*a* having a slotted pulse generating disc 46*a* driven by belt 47*a* from a pulley 49*a*, which in turn is driven in a fixed positional relationship to unit P, and the register control panel 44*a*. Any deviation of a register mark R on web 12 from the positional relationship to unit P that corresponds to correct register is attended by the production of an error signal at panel 44*a*, where the error signal is amplified to generate an impulse of corresponding magnitude which is used to energize correction motor 153 and thereby correspondingly displace the carriage 152 and cause a change of corresponding magnitude in the position and the speed of the web engaging the web driving cylinder 151.

The output shaft of motor 153 is connected by universal joint 165 to a screw 166 that threadably engages nut member 167 pivotably carried on arm 168 secured to a shaft 169 pivotably mounted between the machine frames. The upper end of arm 168 is connected by link 170 to carriage 152. The preprinted web 12 is maintained in firm, non-slipping engagement with cylinders 151 by means of pressure rollers 171 rotatably carried on the outer ends of arms 172, mounted on the carriage. The carriage itself is provided with legs 175 housing sleeve bearings which keep it slidable freely on rods secured to the machine frames by brackets 177.

The control of the tension of the web 12 running from the rollstand to the web registering mechanism is effected by means of a system of the character disclosed in my copending patent application Serial No. 786,843, filed January 14, 1959, for "Automatic Splicing Rollstand." This system makes use of a variable speed V-belt drive including elements 25–28 of FIG. 1 for driving through pulley 24 the belt 14 which continuously propels the web 12 from the rollstand. While the output speed of this drive and, correspondingly, the speed of the belt 52 driving a new web roll to the web speed are again variable by adjustment of the position of the pulley 34 tensioning the V-belt 26, this adjustment is effected according to FIG. 7 upon and in proportion to a variation of the tension of the web engaging the roller 16.

To that end, although roller 16 and pulley 34 are still coupled together by lever arms 37*a* and 35 pivotable on the axis of shaft 36, the arm 38, nut 39, screw 40 and correction motor 41 of the arrangement shown in FIG. 1 are replaced by yieldable means which continuously bias the roller 16 against the web 12 under a constant force counteracting the tension of the web. The lever arm 37*a* which carries roller 16 has an extension 38*a* connected pivotably to the upper end of a piston 180 slidable within a fluid pressure cylinder 182. The arm extension 38*a* preferably is connected also to a piston 183 slidable within dashpot 184, to dampen movements of the roller and pulley 34. A suitable fluid, such as compressed air, is admitted into cylinder 182 and to the hollow in piston 180 through a pipe 185 in which this fluid is maintained continuously under a predetermined substantially constant pressure.

It results that the tension of the web running from the rollstand to the registering mechanism at 150 is maintained under all the varied operating conditions of the machine at a substantially constant value determined by the magnitude of the force biasing the floating roller 16 against the web. Even though changes of the length of parts of the web path will occur with register correcting movements of the carriage 152 and rollers 151, these changes are prevented, according to this further embodiment, from causing any appreciable variation of the tension, register and splicing conditions at the rollstand.

While this invention has been described herein in considerable detail for the purpose of enabling those skilled in the art to practice the same, it is not intended to limit the claimed invention to such details, but to cover all variations which fall within the true spirit and scope of the appended claims.

What is claimed is:

1. Mechanism for delivering a preprinted web in register to a rotary web processing unit from one web supply roll after another, comprising means driven in synchronism with the processing unit for feeding from an expiring roll a web carrying register elements, said web running from said roll to said processing unit, means driven in coupled relation with said web feeding means for driving a new roll of a like web at a peripheral speed equal to the speed of the running web, means for splicing the web of the new roll to the running web before the web supply of the expiring roll has expired, means operable to actuate said splicing means when the new roll is at such speed and a register element fixed relative to a pattern on the surface of the new roll is in at least approximate coincidence with a register element on the running web, web register control means including elements for comparing the position of register elements on the running web with the position of said processing unit, and precise web registering means responsive to impulses from said register control means, and including a variable speed drive driven in synchronism with said processing unit, for adjusting the position of the running web and simultaneously adjusting its speed relative to the speed of said processing unit to correct any detected lack of registration between the running web and the web processing unit.

2. Mechanism according to claim 1 said new roll driving means including friction means non-slippably engaging the periphery of the new roll, said web feeding means including friction means non-slippably engaging the periphery of said expiring roll, the respective drives of these friction means being inter-connected by a coupling having a variable speed ratio, means for adjusting the speed of the new roll relative to that of the running web, including a displaceable member the position of which determines the speed ratio of said coupling, roll register control means including elements for scanning and comparing the positions of register elements respectively on said new roll and on said running web, and a pilot motor responsive to impulses from said roll register control means for positioning said displaceable member so as to bring said respective register elements toward coincidence.

3. Mechanism according to claim 2, said speed adjusting means further including means acting upon the drive of said roll driving means and operative to displace the new roll angularly relative to the running web, simultaneously with a variation of the speed ratio of said coupling, upon the occurrence and for rapid correction of a lack of registration between said positions of register elements.

4. Mechanism according to claim 3, said last-recited means comprising a gear system actuated by said pilot motor upon and according to the extent of the actuation of that motor.

5. Mechanism according to claim 3, said last-recited means including a planetary gear unit connected with the drive of said roll driving means, which unit is rotatable relative to said coupling by a gear segment moved with said displaceable member upon actuation of said pilot motor, whereby at any speed of the running web the angular displacement of the new roll and the simultaneous variation of the speed ratio of said coupling are proportional to each other and to the lack of registration between said positions of register elements.

6. Mechanism according to claim 2, said coupling comprising a V-belt interconnecting driving and driven pulleys one of which has a fixed diameter and the pitch diameter of the other of which is variable by variation of the tension of said V-belt, said displaceable member bearing against said V-belt to control said tension.

7. Mechanism according to claim 1, said precise web registering means including displaceable roller means engaging a portion of the running web and positioned by said web register control means for adjusting the length of the web path leading to said processing unit and means for varying the speed of said variable speed drive simultaneously with and in proportion to displacement of said roller means so as to correct instantaneously a lack of registration between the running web and said processing unit.

8. Mechanism according to claim 7, said roller means comprising displaceable rollers propelling the running web at a location in said path near to said processing unit, said variable speed drive being a part of the drive of said rollers.

9. Mechanism according to claim 8, further comprising tension control means including a roller device biased yieldably against the web in said path for maintaining a substantially constant tension in the web portion extending to said displaceable rollers, said web feeding means being driven through a variable speed coupling, said tension control means including means positioned by said roller device for transiently varying the speed output of said coupling to an extent proportional to any displacement of said roller device.

10. Mechanism according to claim 7, said variable speed drive being a part of the drive of said web feeding means.

11. Mechanism according to claim 10, the drive of said roll driving means being coupled with the drive of said web feeding means so that upon a variation of the speed of the latter the speed input to the former is adjusted correspondingly.

12. Mechanism according to claim 7, said web feeding means comprising an endless belt having a flight that drivingly engages the periphery of said expiring roll and so engages the periphery of said new roll when the splicing has been effected, said belt being driven through said variable speed drive from the drive of said processing unit.

13. Mechanism according to claim 7, further comprising tension control means including a roller device biased yieldably against the web in said path for maintaining a substantially constant tension in the web portion extending between said roller means and said roller device notwithstanding register correcting displacements of said roller means.

14. Mechanism according to claim 7, said variable speed drive comprising a belt interconnecting driving and driven pulleys one of which has a fixed diameter and the pitch diameter of the other of which varies with the tension of said belt, and a belt tensioner engaging said belt to control its tension, said speed varying means including means whereby the relative position of said belt tensioner and said belt is adjusted to vary said tension upon a displacement of said displaceable roller means.

15. Mechanism according to claim 14, said precise web registering means including a pilot motor controlled by said register control means, for positioning said displaceable roller means and controlling the relative position of said belt tensioner and said belt.

16. Mechanism according to claim 15, including a lever which is positioned by said pilot motor and which positions said displaceable roller means and controls said relative position, whereby adjustments of the length of the web path and of the speed of said variable speed drive are always proportional to each other and to the lack of registration to be corrected.

17. In a rollstand mechanism for delivering a preprinted web continuously to a rotary web processing unit from one web supply roll after another, means driven in synchronism with said processing unit for feeding from an expiring roll a web carrying register elements and running from said roll to said procssing unit, means driven in coupled relation with said web feeding means for driving a new roll of a like web at a peripheral speed equal to the speed of said running web, means for splicing the web of said new roll to said running web before the web supply of said expiring roll has expired, means operable to actuate said splicing means when said new roll is at such peripheral speed and a register element fixed relative to a pattern on the surface of the new roll is in at least approximate coincidence with a register element on said running web, register control means including elements for scanning and comparing the positions of register elements respectively on said new roll and on said running web, said new roll driving means including friction means engaging the periphery of the new roll, said web feeding means including friction means engaging the periphery of the expiring roll, the respective drives of these friction means being interconnected by a coupling having a variable speed ratio, and means including a displaceable member the position of which determines the speed ratio of said coupling and a pilot motor responsive to impulses from said register control means for varying the position of said displaceable member and thus adjusting the speed of said new roll relative to that of said running web so as to bring said positions of register elements toward coincidence.

18. Mechanism according to claim 17, said coupling comprising a V-belt interconnecting driving and driven pulleys one of which has a fixed diameter and the pitch diameter of the other of which is variable by variation of the tension of said V-belt, said displaceable member bearing against said V-belt to control said tension.

19. Mechanism according to claim 17, said speed adjusting means further including means acting upon the drive of said new roll driving means and operative to displace the new roll angularly relative to the running web, simultaneously with a variation of the speed ratio of said coupling, upon the occurrence and for rapid correction of a lack of registration between said positions of register elements.

20. Mechanism according to claim 19, said last-recited means comprising a gear system actuated by said pilot motor upon and according to the extent of the actuation of that motor.

21. Mechanism according to claim 19, said last-recited means including a planetary gear unit connected with the drive of said new roll driving means, which unit is rotatable relative to said coupling by a gear segment moved with said displaceable member upon actuation of said pilot motor, whereby at any speed of the running web the angular displacement of the new roll and the simultaneous variation of the speed ratio of said coupling are proportional to each other and to the lack of registration between said positions of register elements.

22. In a rollstand mechanism for delivering a preprinted web continuously to a rotary web processing unit from one web supply roll after another:

(a) means driven in synchronism with said processing unit for feeding from an expiring roll a web carrying register elements and running from said roll to said processing unit;
(b) means driven in coupled relation with said web feeding means for driving a new roll of a like web at a peripheral speed equal to the speed of the running web;
(c) means for automatically splicing the web of said new roll to said running web before the web supply of said expiring roll has expired;
(d) means operable to actuate said automatic splicing means when said new roll is at said peripheral speed and a register element fixed relative to a pattern on the surface of the new roll is in at least approximate coincidence with a register element on said running web;
(e) register control means including elements for scanning and comparing the positions of register elements respectively on the new roll and the running web; and
(f) means responsive to impulses from said register control means for transiently, and in proportion to the magnitude of such impulses, both adjusting the ratio of the speed of said roll driving means to the speed of said web feeding means and simultaneously, but independently of the drive of said roll driving means, displacing the new roll angularly relative to the running web in the direction to correct any detected register error.

23. In a rollstand mechanism for continuously delivering a preprinted web in register to a rotary web processing unit from one web supply roll after another:

(a) means driven in synchronism with said processing unit for feeding from an expiring roll a web carrying register elements and running from said roll to said processing unit;
(b) means driven in coupled relation with said web feeding means for driving a new roll of a like web at a peripheral speed equal to the speed of the running web;
(c) means for automatically splicing the web of said new roll to said running web before the web supply of said expiring roll has expired;
(d) means operable to actuate said automatic splicing means when the new roll is at said peripheral speed and a register element fixed relative to a pattern on the surface of the new roll is in at least approximate coincidence with a register element on the running web;
(e) roll register control means including elements for scanning and comparing the positions of register elements respectively on the new roll and on the running web;
(f) means responsive to impulses from said register control means for transiently, and in proportion to the magnitude of such impulses, both adjusting the ratio of the speed of said roll driving means to the speed of said web feeding means and simultaneously, but independently of the drive of said roll driving means, displacing the new roll angularly relative to the running web in the direction to correct any detected register error;
(g) web register control means including elements for comparing the position of register elements on the running web with the position of said processing unit; and (h) precise web registering means responsive to impulses from said web register control means, and including a variable speed drive driven in synchronism with said processing unit, for transiently varying the position of the running web and simultaneously varying its speed relative to the speed of said processing unit so as to correct any detected lack of register between the running web and the web processing unit.

24. In a rollstand mechanism for splicing a rotating roll of a preprinted web in register to a like web running beside the roll, means driven in synchronism with the running web for driving said roll at a peripheral speed equal to the speed of the running web, means operable to vary the ratio of the speed of said roll driving means to the speed of the drive thereof, further drive means independent of said drive of the roll driving means for displacing said roll angularly relative to the running web, and control means operable upon the sensing of a register error between the running web and the web on the periphery of said roll to simultaneously (a) actuate said further drive means transiently for angular displacement of said roll in the direction to correct the register error and (b) operates said ration varying means proportionately so as to adjust transiently in the same direction the speed of the rotation of the roll by said roll driving means, whereby said roll may be brought rapidly into the required register and speed coincidence with the running web.

References Cited by the Examiner

UNITED STATES PATENTS

| | | | |
|---|---|---|---|
| 2,212,812 | 8/40 | Horton | 242—58.3 |
| 2,536,153 | 1/51 | Bishop | 242—58.3 |
| 2,899,143 | 8/59 | Grosfield et al. | 242—58.3 |

FOREIGN PATENTS

| | | |
|---|---|---|
| 798,330 | 7/58 | Great Britain. |

MERVIN STEIN, *Primary Examiner.*